(12) United States Patent
Houtz

(10) Patent No.: US 6,442,936 B1
(45) Date of Patent: Sep. 3, 2002

(54) SINGLE STAGE OR MULTI-STAGE COMPRESSOR FOR A TURBOCHARGER

(75) Inventor: Phillip J. Houtz, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/737,110

(22) Filed: Dec. 14, 2000

(51) Int. Cl.$^7$ .............................................. F02B 33/44
(52) U.S. Cl. .......................... 60/612; 60/611; 60/39.07; 123/562; 415/120; 415/146; 417/407; 137/512.1
(58) Field of Search ....................... 60/612, 611, 39.07; 123/562; 415/146, 147, 120; 417/407; 137/512.1

(56) References Cited

U.S. PATENT DOCUMENTS

| | | | | |
|---|---|---|---|---|
| 2,092,565 A | * | 9/1937 | Waseige | 123/562 |
| 2,767,561 A | * | 10/1956 | Seeger | 60/39.07 |
| 2,773,348 A | * | 12/1956 | Grieshaber et al. | 60/611 |
| 4,082,477 A | * | 4/1978 | Kronogard | 415/120 |
| 4,951,706 A | * | 8/1990 | Kardos | 137/512.1 |
| 5,157,924 A | | 10/1992 | Sudmanns | |
| 5,207,063 A | * | 5/1993 | Blake | 60/612 |
| 5,313,779 A | * | 5/1994 | Rodgers | 60/39.07 |
| 5,993,151 A | * | 11/1999 | Paulsen et al. | 415/146 |
| 6,029,452 A | * | 2/2000 | Halimi et al. | 60/612 |

FOREIGN PATENT DOCUMENTS

| | | | | |
|---|---|---|---|---|
| JP | 360147538 A | * | 8/1985 | 417/407 |
| JP | 363201319 A | * | 8/1988 | 123/562 |

* cited by examiner

Primary Examiner—Thomas Denion
Assistant Examiner—Thai-Ba Trieu
(74) Attorney, Agent, or Firm—Todd T. Taylor

(57) ABSTRACT

A turbocharger for an internal combustion engine has a compressor operable as a single stage or multi-stage compressor. A first compressor stage includes a first compressor wheel carried by a shaft, an axially extending first inlet and a radially extending first outlet. A second compressor stage includes a second compressor wheel carried by the shaft and axially extending second inlet and a radially extending second outlet. An interstage duct fluidly connects in series the first outlet of the first compressor with the second inlet of the second compressor. The interstage duct includes a bypass opening includes in communication with an ambient environment. A valve is positioned within the interstage duct. The valve is moveable to and between a first position to close the interstage duct and a second position to close the bypass opening.

25 Claims, 1 Drawing Sheet

SINGLE STAGE OR MULTI-STAGE COMPRESSOR FOR A TURBOCHARGER

TECHNICAL FIELD

The present invention relates to a turbocharger for use in an internal combustion engine, and, more particularly, to a turbocharger having a two-stage compressor.

BACKGROUND ART

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chamber. The fluid which is compressed by the compressor may be in the form of combustion air or a fuel and air mixture.

A turbocharger may also include a two-stage compressor with two separate compressor wheels which are carried and driven by a common shaft coupled with the turbine. U.S. Pat. No. 5,157,924 (Sudmanns) discloses a two-stage compressor with compressor wheels which are carried by a common shaft and disposed in a face-to-face manner relative to each other. The two compressors are arranged in a parallel manner such that each compressor provides an output to a charge air collecting duct in parallel. During idle or light load conditions during operation, the outlet of one of the compressors is closed so that only a single compressor provides an output to the charge air collecting duct.

With a two-stage compressor as disclosed in Sudmanns '924, the pressure ratio on the output side of the two compressors is limited since the compressors provide an output in a parallel manner to the charge air collecting duct. Moreover, stalling one of the compressors by merely closing the output therefrom may result in overheating of the compressor.

The present invention is directed to overcoming one or more of the problems as set forth above.

DISCLOSURE OF THE INVENTION

In one aspect of the invention, a turbocharger for an internal combustion engine is provided with a rotatable shaft. A first compressor stage includes a first compressor wheel carried by the shaft, an axially extending first inlet and a radially extending first outlet. A second compressor stage includes a second compressor wheel carried by the shaft, an axially extending second inlet and a radially extending second outlet. An interstage duct fluidly connects in series the first outlet of the first compressor stage with the second inlet of the second compressor stage. The interstage duct includes a bypass opening in communication with an ambient environment. A valve is positioned within the interstage duct. The valve is moveable to and between a first position to close the interstage duct and a second position to close the bypass opening.

In another aspect of the invention, an internal combustion engine is provided with an intake manifold and a turbocharger. The turbocharger includes a rotatable shaft. A first compressor stage includes a first compressor wheel carried by the shaft, an axially extending first inlet and a radially extending first outlet. A second compressor stage includes a second compressor wheel carried by the shaft, an axially extending second inlet and a radially extending second outlet in communication with the intake manifold. An interstage duct fluidly connects in series the first outlet of the first compressor stage with the second inlet of the second compressor stage. The interstage duct includes a bypass opening in communication with an ambient environment. A valve positioned within the interstage duct is moveable to and between a first position to close the interstage duct and a second position to close the bypass opening.

In yet another aspect of the invention, a method of operating a turbocharger in an internal combustion engine is provided with the steps of: providing a first compressor stage including a first compressor wheel carried by a shaft, and axially extending first inlet and a radially extending first outlet; providing a second compressor stage including a second compressor wheel carried by the shaft, an axially extending second inlet and a radially extending second outlet; fluidly interconnecting in series the first outlet of the first compressor stage with the second inlet of the second compressor stage with an interstage duct, the interstage duct including a bypass opening in communication with an ambient environment; positioning a valve within the interstage duct; moving the valve to a selected position between a first position closing the interstage duct and a second position closing a bypass opening; and rotating the shaft with the first compressor wheel and the second compressor wheel.

BEST MODE FOR CARRYING OUT THE INVENTION

Figure 1:
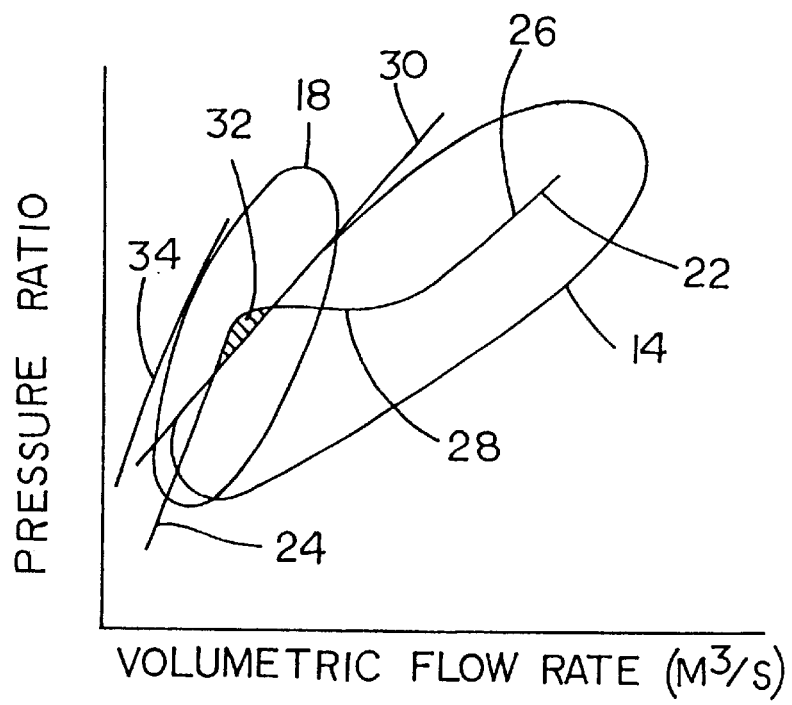
FIG. 1 is a graphical illustration of a compressor operating map for a turbocharger having an embodiment of a multi-stage compressor of the present invention.

Referring now to the drawings, and more particularly to FIG. 1, there is shown an operating map for a multi-stage (i.e., two-stage) compressor 10 of turbocharger 12 shown in FIG. 2 and described in more detail hereinafter. Map 14 represents the operating behavior of compressor 10, and map 18 represents the operating behavior of compressor wheel 20 alone. Together, map 14 and map 18 define an allowable operating region of two-stage compressor 10.

In general, as the volumetric flow rate of turbocharger 12 increases as a result of increased shaft speed, the pressure ratio of turbocharger 12 likewise increases. A lower portion 24 of operating curve 22 corresponds to engine low speed conditions, an upper portion 26 corresponds to engine high speed conditions, and an intermediate portion 28 corresponds to a transition zone on operating curve 22 where the operating curve transitions from map 18 associated with compressor wheel 20 and map 14 associated with compressor wheel 16.

Line 30 represents the surge line of two-stage compressor 10. It is preferable to maintain the maximum operating curve 22 to the right of surge line 30 at all times so that surging of two-stage compressor 10 does not occur. However, as shown by the cross-hatched area 32, the portion of operating curve 22 between lower portion 24 and intermediate portion 28 does move to the left of surge line 30, thus causing surge of two-stage compressor 10.

Line 34 represents the surge line of compressor wheel 20 alone. As can be seen, operating curve 22 always stays to the right of surge line 34. The present invention advantageously operates two-stage compressor 10 as a two-stage or single stage compressor to effectively manipulate the turbocharger surge line characteristics to meet the engine operating line requirements throughout the speed/load range of the engine.

Figure 2:
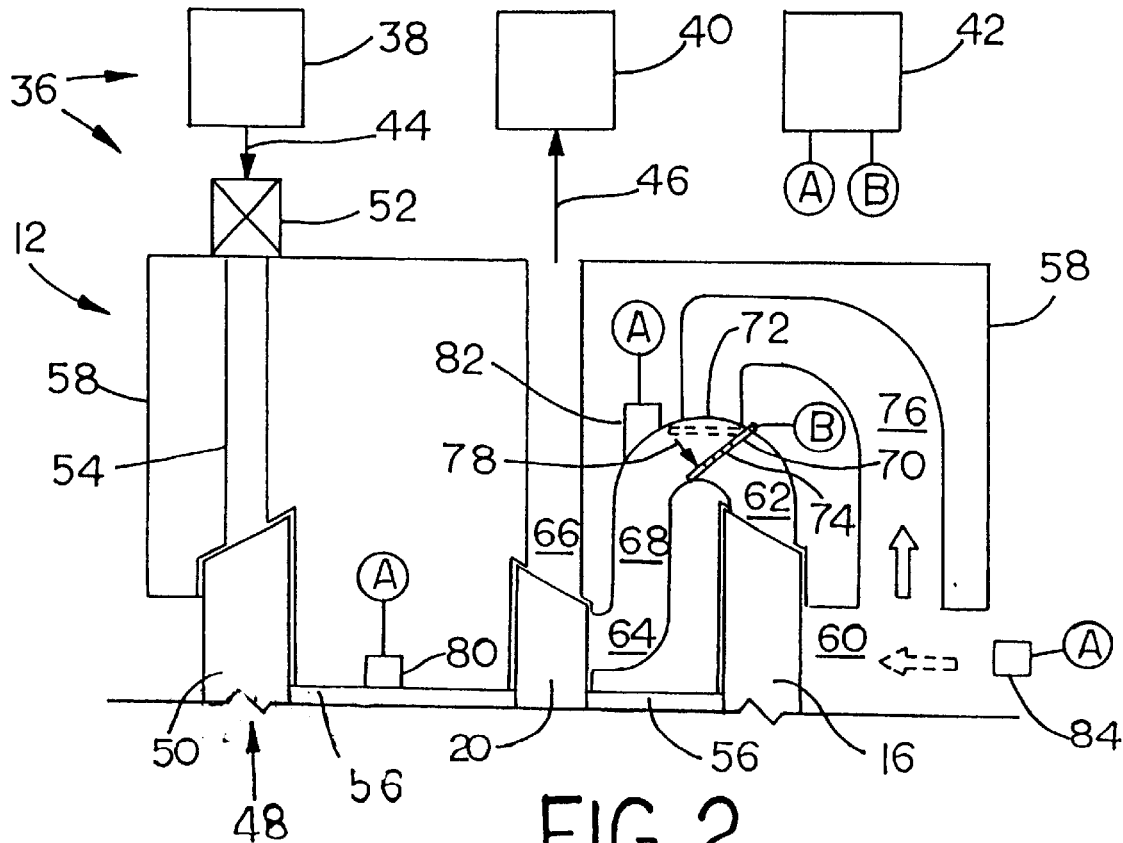
FIG. 2 is a simplified, side-sectional view of an internal combustion engine including an embodiment of a turbocharger of the present invention.

Referring now to FIG. 2, turbocharger 12 forming part of an internal combustion engine 36 will be described in greater detail. Internal combustion engine 36 generally includes turbocharger 12, exhaust manifold 38, intake manifold 40 and controller 42.

Exhaust manifold 38 receives exhaust gas from a plurality of combustion cylinders (not shown). At least a portion of the exhaust gas is directed to turbocharger 12, as indicated by line 44. Intake manifold 40 receives pressurized combustion air or an air/fuel mixture from turbocharger 12, as indicated by line 46. Intake manifold 40 is disposed in fluid communication with the plurality of combustion cylinders to provide combustion air or an air/fuel mixture thereto.

Turbocharger 12 includes two-stage compressor 10 and turbine 48. Turbine 48 is driven by exhaust gas from exhaust manifold 38. More particularly, exhaust gas flows through a variable nozzle 52, inlet duct 54 and impinges in a radial direction on turbine wheel 50. Variable nozzle 52 controls the velocity of the exhaust gas which impinges upon turbine wheel 50, thereby controlling the rotational speed of turbine wheel 50. Turbine wheel 50 is carried by shaft 56, which in turn is rotably carried by multi-part housing 58.

Compressor wheel 16 defines a first compressor wheel, and compressor wheel 20 defines a second compressor wheel. Each of first compressor wheel 16 and second compressor wheel 20 are carried by common shaft 56. Thus, rotation of shaft 56 by turbine wheel 50 in turn causes rotation of first compressor wheel 16 and second compressor wheel 20. First compressor wheel 16 and second compressor wheel 20 each face in a common direction away from turbine wheel 50, and thus are termed "forward facing" compressor wheels. First compressor wheel 16 has a diameter which is larger than second compressor wheel 20, yielding a larger pressure ratio for first compressor wheel 16 when compared with second compressor wheel 20. In the embodiment shown, first compressor wheel 16 has a diameter providing a rated pressure ratio of between 1.5:1 and 3:1 and second compressor wheel 20 has a diameter providing a total pressure ratio between about 2:1 and 3.5:1.

First compressor wheel 16 of the first compressor stage includes a first inlet 60 which receives combustion air or a fuel/air mixture, and a first outlet 62. Similarly, second compressor wheel 20 of the second compressor stage has a second inlet 64 and a second outlet 66. First outlet 62 associated with first compressor wheel 16 is connected in series with second inlet 64 associated with second compressor wheel 20 via interstage duct 68.

Plate valve 70 is positioned within interstage duct 68 and is coupled with controller 42, as indicated at reference number B. Plate valve 70 is spring biased to the first position closing interstage duct 68, as represented by arrow 78. Controller 42 selectively moves plate valve 70 between a first position (shown in solid lines) to close interstage duct 68 and a second position (shown in dashed lines) to close bypass opening 72. Plate valve 70 includes a plurality of leakage holes 74 allowing a limited amount of fluid flow therethrough when plate valve 70 is in the first position closing interstage duct 68, thereby allowing limited cooling of first compressor wheel 16.

A bypass duct 76 terminates at bypass opening 72. Bypass duct 76 is disposed in parallel with first inlet 60 of first compressor wheel 16. Bypass duct 76 allows combustion air or an air/fuel mixture to be transported into interstage duct 68 when plate valve 70 is in the first position closing interstage duct 68.

Sensors 80, 82 and 84 are each coupled with controller 42 and provide an output signal thereto, as indicated by reference letter A. Sensor 80 senses a rotational speed of shaft 56; sensor 82 senses pressure within interstage duct 68; and sensor 84 senses a volumetric flow rate of combustion air or an air/fuel mixture flowing to first inlet 60 and/or bypass opening 72. Controller 42 selectively controls a position of plate valve 70, depending upon a signal received from sensor 80, 82 and/or 84. Other engine operating parameters such as engine speed may also be sensed.

INDUSTRIAL APPLICABILITY

During use, exhaust gas is transported from exhaust manifold 38 to variable nozzle 52. The diameter of variable nozzle 52 is controlled to thereby control the flow velocity of the exhaust gas flowing through inlet duct 54 and impinging upon turbine wheel 50. Turbine wheel 50 is coupled with shaft 56, which in turn carries first compressor wheel 16 and second compressor wheel 20. The rotational speed of first compressor wheel 16 and second compressor wheel 20 thus corresponds to the rotational speed of shaft 56. Depending upon the diameter of first compressor wheel 16 and second compressor wheel 20, the tangential velocity at the radial periphery thereof varies. The larger the diameter, the higher the tangential velocity at the outside diameter. The pressure ratio of first compressor wheel 16 and second compressor wheel 20 may thus be varied depending upon the selected diameter. During normal or high speed engine operation, the pressure within interstage duct 68 overcomes the spring bias against plate valve 70 and moves plate valve 70 to a second position closing bypass opening 72. Thus, two-stage compressor 10 operates using operating curve 22 associated with maps 14 and 18 (FIG. 1). During low speed or idle conditions of the internal combustion engine, the pressure within interstage duct 68 drops and a spring biased force exerted against plate valve 70 moves plate valve 70 to the first position closing interstage duct 68. The combustion air or air/fuel mixture is thus transported through bypass duct 76 to bypass opening 72, thereby allowing two-stage compressor 10 to operate as a single stage compressor utilizing only second compressor wheel 20. To ensure adequate cooling of first compressor wheel 16, a limited amount of flow occurs through leakage holes 74 in plate valve 70 within interstage duct 68. Other operating perimeters sensed by sensors 80, 82 and/or 84 may also be utilized to controllably adjust the position of plate valve 70 using controller 42.

In the embodiments shown in the drawings and described above, the valve within interstage duct 68 allowing either two-stage or single stage operation of turbocharger 12 is in the form of a plate valve 70. However, it is to be understood that other types of valves which may effectively open and close interstage duct 68 and bypass opening 72 may also be provided.

The present invention provides a turbocharger for use in an internal combustion engine with two compressor wheels which may normally be operated as a two-stage compressor. However, under certain operating conditions only a single compressor wheel is utilized to thereby provide a single stage compressor. This has the effect of shifting the surge line to the left of the operating characteristic map for the two-stage compressor, thereby effectively inhibiting surge of the turbocharger during low speed or idle conditions. The valve which is disposed within the interstage duct to effect the single stage or two-stage operation of the compressor may either be mechanically actuated (with or without overriding electronic actuation) or electronically actuated based on sensor signals associated with an operating characteristic of the internal combustion engine.

Other aspects, objects and advantages of this invention can be obtained from a study of the drawings, the disclosure and the appended claims.

What is claimed is:

1. A turbocharger for an internal combustion engine, comprising:
   a rotatable shaft;
   a first compressor stage including a first compressor wheel carried by said shaft, an axially extending first inlet and a radially extending first outlet;
   a second compressor stage including a second compressor wheel carried by said shaft, an axially extending second inlet and a radially extending second outlet;
   an interstage duct fluidly connecting in series said first outlet of said first compressor stage with said second inlet of said second compressor stage, said interstage duct including a bypass opening between said first outlet and said second inlet;
   a bypass duct fluidly connecting said bypass opening in communication with an ambient environment; and
   a valve positioned within said interstage duct, said valve movable to and between a first position to close said interstage duct and a second position to close said bypass opening.

2. The turbocharger of claim 1, wherein said valve is spring biased.

3. The turbocharger of claim 2, wherein said valve is spring biased to said first position.

4. The turbocharger of claim 1, wherein said valve includes a plate.

5. The turbocharger of claim 4, wherein said plate includes leakage holes extending therethrough.

6. The turbocharger of claim 1, wherein each of said first compressor wheel and said second compressor wheel face in a common direction.

7. The turbocharger of claim 6, including a turbine, and wherein each of said first compressor wheel and said second compressor wheel face in a common direction away from said turbine.

8. The turbocharger of claim 1, wherein said first compressor has a pressure ratio of between about 1.5:1 and 3:1, and said second compressor has a pressure ratio of between about 2:1 and 3.5:1.

9. The turbocharger of claim 1, including a turbine with a variable nozzle inlet, said turbine connected with and driving said shaft.

10. The turbocharger of claim 1, including at least one housing defining said first inlet, said first outlet, said second inlet, said second outlet and said interstage duct.

11. The turbocharger of claim 10, wherein said at least one housing includes multiple housing parts.

12. A turbocharger for an internal combustion engine, comprising:
   a rotatable shaft;
   a first compressor stage including a first compressor wheel carried by said shaft, an axially extending first inlet and a radially extending first outlet;
   a second compressor stage including a second compressor wheel carried by said shaft, an axially extending second inlet and a radially extending second outlet;
   an interstage duct fluidly connecting in series said first outlet of said first compressor stage with said second inlet of said second compressor stage, said interstage duct including a bypass opening in communication with an ambient environment; and
   a valve positioned within said interstage duct, said valve movable to and between a first position to close said interstage duct and a second position to close said bypass opening; and
   a controller coupled with said valve to selectively move said valve between said first position and said second position.

13. The turbocharger of claim 12, including a sensor for sensing at least one of engine speed, volumetric flow rate of combustion air, rotational speed of said shaft, pressure within said interstage duct, absolute boost pressure and atmospheric pressure, said sensor coupled with and providing an output signal to said controller, said controller selectively moving said valve dependent upon said sensor signal.

14. An internal combustion engine, comprising:
   an intake manifold; and
   a turbocharger including:
   a rotatable shaft;
   a first compressor stage including a first compressor wheel carried by said shaft, an axially extending first inlet and a radially extending first outlet;
   a second compressor stage including a second compressor wheel carried by said shaft, an axially extending second inlet and a radially extending second outlet in communication with said intake manifold;
   an interstage duct fluidly connecting in series said first outlet of said first compressor stage with said second inlet of said second compressor stage, said interstage duct including a bypass opening between said first outlet and said second inlet;
   a bypass duct fluidly connecting said bypass opening in communication with an ambient environment; and
   a valve positioned within said interstage duct, said valve movable to and between a first position to close said interstage duct and a second position to close said bypass opening.

15. The internal combustion engine of claim 14, wherein said valve is spring biased.

16. The internal combustion engine of claim 15, wherein said valve is spring biased to said first position.

17. The internal combustion engine of claim 14, wherein said valve includes a plate.

18. The internal combustion engine of claim 17, wherein said plate includes leakage holes extending therethrough.

19. An internal combustion engine comprising:
   an intake manifold; and
   a turbocharger including:
   a rotatable shaft;
   a first compressor stage including a first compressor wheel carried by said shaft, an axially extending first inlet and a radially extending first outlet;
   a second compressor stage including a second compressor wheel carried by said shaft, an axially extending second inlet and a radially extending second outlet in communication with said intake manifold;
   an interstage duct fluidly connecting in series said first outlet of said first compressor stage with said second inlet of said second compressor stage, said interstage duct including a bypass opening in communication with an ambient environment; and a valve positioned within said interstage duct, said valve movable to and between a first position to close said interstage duct and a second position to close said bypass opening; and a controller coupled with said valve to selectively move said valve between said first position and said second position.

20. The internal combustion engine of claim 19, including a sensor for sensing at least one of engine speed, volumetric flow rate of combustion air, rotational speed of said shaft and pressure within said interstage duct, said sensor coupled with and providing an output signal to said controller, said controller selectively moving said valve dependent upon said sensor signal.

21. A method of operating a turbocharger in an internal combustion engine, comprising the steps of:

providing a first compressor stage including a first compressor wheel carried by a shaft, an axially extending first inlet and a radially extending first outlet;

providing a second compressor stage including a second compressor wheel carried by said shaft, an axially extending second inlet and a radially extending second outlet;

fluidly interconnecting in series said first outlet of said first compressor stage with said second inlet of said second compressor stage with an interstage duct, said interstage duct including a bypass opening between said first outlet and said second inlet;

fluidly interconnecting said bypass opening in communication with an ambient environment;

positioning a valve within said interstage duct;

moving said valve to a selected position between a first position closing said interstage duct and a second position closing said bypass opening; and rotating said shaft with said first compressor wheel and said second compressor wheel.

22. The method of claim 21, wherein said moving step includes biasing said valve to said first position.

23. The method of claim 21, wherein said valve includes a plate with leakage holes extending therethrough, said moving step includes moving said plate to said first position, and including the step of leaking air through said leakage holes.

24. A method of operating a turbocharger in an internal combustion engine, comprising the steps of:

providing a first compressor stage including a first compressor wheel carried by a shaft, an axially extending first inlet and a radially extending first outlet;

providing a second compressor stage including a second compressor wheel carried by said shaft, an axially extending second inlet and a radially extending second outlet;

fluidly interconnecting in series said first outlet of said first compressor stage with said second inlet of said second compressor stage with an interstage duct, said interstage duct including a bypass opening in communication with an ambient environment;

positioning a valve within said interstage duct;

moving said valve to a selected position between a first position closing said interstage duct and a second position closing said bypass opening; and rotating said shaft with said first compressor wheel and said second compressor wheel;

providing a controller coupled with said valve; and selectively moving said valve between said first position and said second position using said controller.

25. The method of claim 24, including the steps of:

sensing an operating parameter corresponding to at least one of engine speed, volumetric flow rate of combustion air, rotational speed of said shaft and pressure within said interstage duct using a sensor; and selectively moving said valve with said controller dependent upon said sensed operating parameter.

* * * * *